United States Patent [19]

Amano et al.

[11] Patent Number: 5,403,899
[45] Date of Patent: Apr. 4, 1995

[54] METHOD FOR PREPARING POWDER INCLUDING ADDING FLUORO NON-IONIC SURFACTANT AFTER 70% POLYMERIZATION IS REACHED OF VINYL CHLORIDE POLYMERS

[75] Inventors: Tadashi Amano, Kawasaki; Toshimichi Koga, Kashima, both of Japan

[73] Assignee: Shin-Etsu Chemical Co., Ltd., Japan

[21] Appl. No.: 186,899

[22] Filed: Jan. 27, 1994

Related U.S. Application Data

[62] Division of Ser. No. 743,027, Aug. 9, 1991, abandoned.

[30] Foreign Application Priority Data

Aug. 20, 1990 [JP] Japan .................................. 2-218581
Sep. 6, 1990 [JP] Japan .................................. 2-234446

[51] Int. Cl.$^6$ .............................................. C08F 2/16
[52] U.S. Cl. ...................... 526/214; 524/834; 526/199; 526/200; 526/201; 526/202; 526/209
[58] Field of Search ............... 526/199, 200, 201, 202, 526/209, 214, 216, 225

[56] References Cited

U.S. PATENT DOCUMENTS

| | | | |
|---|---|---|---|
| 3,271,341 | 9/1966 | Garrison, Jr. ..................... | 526/209 |
| 3,548,035 | 12/1970 | Ohe ..................................... | 526/200 |
| 3,642,745 | 2/1972 | Golstein ........................... | 526/194 |
| 3,697,493 | 10/1972 | Meyer ............................... | 526/194 |
| 3,775,357 | 11/1973 | Nemeth ............................ | 524/834 |
| 3,895,000 | 7/1975 | Mathieu ........................... | 526/344.2 |
| 4,657,999 | 4/1987 | Hoefer ............................... | 526/200 |
| 5,045,611 | 9/1991 | McNeil ............................. | 526/81 |

FOREIGN PATENT DOCUMENTS 2036040  6/1980  United Kingdom .

*Primary Examiner*—Christopher Henderson
*Attorney, Agent, or Firm*—Parkhurst, Wendel & Rossi

[57] ABSTRACT

A method for preparing powder of a vinyl chloride polymer comprises the steps of polymerizing vinyl chloride monomer or a vinyl monomer mixture mainly comprising vinyl chloride monomer in an aqueous medium and adding, to the polymerization system, a fluorine atom-containing nonionic surfactant in an amount ranging from 0.0001 to 0.5 part by weight per 100 parts by weight of the vinyl chloride monomer or the vinyl monomer mixture mainly comprising vinyl chloride monomer after the rate of polymerization reaches at least 70% or fine powder of at least one inorganic substance having a particle size ranging from 0.001 to 50 μm in an amount ranging from 0.001 to 1.0 part by weight per 100 parts by weight of the vinyl chloride monomer or the vinyl monomer mixture mainly comprising vinyl chloride monomer after the rate of polymerization reaches at least 70%. The method for preparing powder of a vinyl chloride polymer makes it possible to form powder of a vinyl chloride polymer which is not electrically charged during, for instance, the storage and transport thereof. The resulting polymer powder hardly causes reduction of the bulk density and flow properties.

5 Claims, No Drawings

METHOD FOR PREPARING POWDER INCLUDING ADDING FLUORO NON-IONIC SURFACTANT AFTER 70% POLYMERIZATION IS REACHED OF VINYL CHLORIDE POLYMERS

This is a division of application Ser. No. 07/743,027, filed Aug. 9, 1991, now abandoned.

BACKGROUND OF THE INVENTION

The present invention relates to a method for preparing powder of a vinyl chloride polymer and more particularly to a method for preparing polymer powder by polymerizing, in an aqueous medium, vinyl chloride monomer or a vinyl monomer mixture principally comprising vinyl chloride monomer.

Vinyl chloride polymers have been prepared by polymerizing vinyl chloride monomer or a vinyl monomer mixture mainly comprising vinyl chloride monomer in an aqueous medium containing additives such as a suspending agent and a polymerization initiator and then dehydrating and drying the resulting polymer. However, the powder of the polymer thus obtained is liable to be electrically charged during drying or transporting the same, which in turn leads to the reduction of flow properties; hence the formation of blocks and the occurrence of clogging of the drying machine and the transport pipes. Moreover, the electrically charged polymer powder causes substantial reduction in the bulk density and, for this reason, the electrification of polymer powder easily leads to weighing error upon, for instance, volumetrically weighing the polymer powder. These phenomena become more conspicuous in the winter season during which both the temperature and humidity are low.

There have been proposed a variety of methods for preventing the electrification of powdery polymer and most of such methods generally comprise adding, to the powder of vinyl chloride polymers, a surfactant such as a nonionic surfactant, an anionic surfactant and/or a cationic surfactant to thus impart water retention characteristics to the surface of the polymer powder. However, the foregoing methods cannot sufficiently prevent the reduction in the bulk density and the lowering of the flow properties and, on the contrary, they suffer from another problem in that the thermal stability of the resulting product is sometimes impaired.

In addition to the foregoing problems, these conventional methods further suffer from the problem of adhesion of polymer scale onto the inner wall of the polymerizer.

SUMMARY OF THE INVENTION

The present invention has been completed for solving the foregoing problems associated with the conventional methods and accordingly an object of the present invention is to provide a method for preparing powder of vinyl chloride polymers which have high quality, are hardly charged electrically and do not cause any reduction of the bulk density and flow properties.

According to an aspect of the present invention (first invention), there is provided a method for preparing powder of a vinyl chloride polymer which comprises the steps of polymerizing vinyl chloride monomer or a vinyl monomer mixture mainly comprising vinyl chloride monomer in an aqueous medium and adding, to the polymerization system, a fluorine atom-containing nonionic surfactant in an amount ranging from 0.0001 to 0.5 part by weight per 100 parts by weight of the vinyl chloride monomer or the vinyl monomer mixture mainly comprising vinyl chloride monomer after the rate of polymerization reaches at least 70%.

According to another aspect of the present invention (second invention), there is provided a method for preparing powder of a vinyl chloride polymer which comprises the steps of polymerizing vinyl chloride monomer or a vinyl monomer mixture mainly comprising vinyl chloride monomer in an aqueous medium and adding, to the polymerization system, fine powder of an inorganic substance having a particle size ranging from 0.001 to 50 $\mu$m in an amount ranging from 0.001 to 1.0 part by weight per 100 parts by weight of the vinyl chloride monomer or the vinyl monomer mixture mainly comprising vinyl chloride monomer after the rate of polymerization reaches at least 70%.

According to the method for preparing powder of a vinyl chloride polymer, powder of vinyl chloride polymers which are hardly electrically charged can be obtained. The polymer powder thus prepared hardly causes the reduction of bulk density and the lowering of flow properties. Besides, the method ensures the production of polymers which satisfy the quality requirements for the vinyl chloride polymer.

DETAILED EXPLANATION OF THE INVENTION

The starting monomers used for preparing the powder of vinyl chloride polymers are, for instance, vinyl chloride monomer or a mixture of not less than 50% by weight of vinyl chloride monomer and at least one other vinyl monomer copolymerizable with vinyl chloride monomer.

Examples of the vinyl monomers copolymerizable with vinyl chloride monomer include vinyl esters such as vinyl acetate and vinyl propionate; acrylates or methacrylates such as methyl acrylate, ethyl acrylate, methyl methacrylate and ethyl methacrylate; olefins such as ethylene and propylene; and vinyl ethers such as lauryl vinyl ether and isobutyl vinyl ether. In addition, it is also possible to copolymerize vinyl chloride monomer with other monomers such as maleic anhydride, acrylonitrile, styrene and vinylidene chloride. These monomers other than vinyl chloride monomer can be used alone or in any combination thereof.

As the fluorine atom-containing nonionic surfactants which may be used in the first aspect of the present invention, there may be mentioned, for instance, perfluoroalkylpolyoxyethyleneethylalcohol and fluorine alkylester. Specific examples thereof preferably include Surflon S-381 and S-382 available from Asahi Glass Co., Ltd., Monflor 51, Monflor 52 and Monflor 53 available from Kao Atlas Corporation, and Fluorad FC-170C, FC-430 and FC-431 available from Sumitomo 3M Co., Ltd.

The fluorine atom-containing nonionic surfactants are desirably used in an amount ranging from 0.0001 to 0.5 part by weight, preferably 0.005 to 0.1 part by weight per 100 parts by weight of the vinyl chloride monomer or the vinyl monomer mixture mainly comprising vinyl chloride monomer. This is because, if the amount of the nonionic surfactant used is less than 0.0001 part by weight, the flow properties of the resulting polymer powder are not improved, while even if it exceeds 0.5 part by weight, any further improvement of the properties of the polymer powder is not anticipated and on the contrary, the rate of gelation thereof during fabrication of articles is lowered.

The addition of the fluorine atom-containing nonionic surfactant is performed after the rate of polymerization of the reaction system reaches 70% or more. If the addition thereof is performed before the rate of polymerization reaches at least 70%, the formation of polymer particles is adversely affected by the addition thereof.

When the fluorine atom-containing nonionic surfactant is added to the polymerization system, those which are liquid state and have a low viscosity can be pumped into the system without any treatment, while if they are solid or have a high viscosity, they are diluted with a proper solvent or dispersed in water and then pumped into the system.

As the fine powder of inorganic substances used in the second aspect of the present invention, there may be mentioned, for instance, graphite, calcium hydroxide, silica, calcium silicate, aluminum oxide, titanium oxide, calcium carbonate, magnesium carbonate, barium sulfate and calcium sulfate which may be used alone or in any combination thereof.

The fine powder of inorganic substances preferably has an average particle size ranging from 0.001 to 50 $\mu$m. Those having an average particle size of less than 0.001 $\mu$m have low dispersibility in the polymerization system and exhibit only low flow properties-improving effect. On the other hand, those having an average particle size of more than 50 $\mu$m likewise exhibit insufficient flow properties-improving effect.

The fine powder of inorganic substances is desirably used in an amount ranging from 0.001 to 1.0 part by weight, preferably 0.05 to 0.2 part by weight per 100 parts by weight of the vinyl chloride monomer or the vinyl monomer mixture mainly comprising vinyl chloride monomer used as the starting material. This is because if they are used in an amount of less than 0.001 part by weight, the flow properties of the resulting polymer are not improved, while the use thereof in an amount of more than 1.0 part by weight is unfavorable in economy since any further improvement in the properties of the resulting polymer powder is not anticipated.

The addition of the fine powder of inorganic substances is performed after the rate of polymerization of the reaction system reaches 70% or more. The addition thereof to the reaction system before the rate reaches at least 70% leads to the adhesion of scale onto the entire inner wall surface of the polymerizer.

The fine powder of inorganic substances can be added to the reaction system in the powdery state or after dispersing them in water. The dispersion of them in water may be performed utilizing a homogenizer, a colloid mill, a jet mixer or the like in place of the usual stirring machines.

In addition, dispersing agents and/or polymerization initiators commonly used in the conventional method for preparing vinyl chloride polymers may also be used in the method of the present invention.

Examples of such dispersing agents include water-soluble cellulose ethers such as methyl cellulose, ethyl cellulose, hydroxyethyl cellulose, hydroxypropyl cellulose and hydroxypropylmethyl cellulose; water-soluble polymers such as water-soluble or oil-soluble partially saponified polyvinyl alcohols, polymers of acrylic acid and gelatin; oil-soluble emulsifying agents such as sorbitan monolaurate, sorbitan trioleate, sorbitan monostearate, glycerin tristearate and ethylene oxide-propylene oxide block copolymers; water-soluble emulsifying agents such as polyoxyethylene sorbitan monolaurate, polyoxyethylene glycerin oleate and lauric acid; calcium carbonate, calcium phosphate and sodium dodecylbenzenesulfonate. These dispersing agents may be used alone or in any combination thereof.

The polymerization initiators may be those currently used in the preparation of vinyl chloride polymers. Specific examples thereof are peroxycarbonate compounds such as diisopropyl peroxydicarbonate, di-2-ethylhexyl peroxydicarbonate and diethoxyethyl peroxydicarbonate; peroxyester compounds such as t-butyl peroxy pivalate, t-hexyl peroxy pivalate, $\alpha$-cumyl peroxy neodecanate and 2,4,4-trimethylpentyl-2-peroxy-2-neodecanate; peroxide compounds such as acetylcyclohexylsulfonyl peroxide, 2,4,4-trimethylpentyl-2-peroxyphenoxy acetate, 3,5,5-trimethylhexanoyl peroxide and lauroyl peroxide; azo compounds such as azobis-2,4-dimethylvaleronitrile and azobis(4-methoxy-2,4-dimethylvaleronitrile); potassium persulfate, ammonium persulfate, hydrogen peroxide and cumene hydroperoxide. These polymerization initiators may be used alone or in combination.

In the method according to the present invention, the polymerization of the monomer or the monomer mixture can be carried out under the same polymerization conditions as those used in the conventional methods, such as the manner of the addition of ingredients, for instance, the aqueous medium, vinyl chloride or the monomer mixture comprising vinyl chloride, the dispersing agent and the polymerization initiator to the polymerizer, the relative ratio of these ingredients and polymerization temperature.

In the method of the present invention, other additives commonly used in the production of vinyl chloride polymers may, if necessary, be used. Such additives include, for instance, polymerization regulators, chain transfer agents, pH adjustors, gelation-improving agents, antistatic agents, crosslinking agents, stabilizers, fillers, buffering agents and scale-inhibiting agents. Moreover, an antioxidant may be used for the purposes of inhibiting the polymerization reaction and of preventing the deterioration of the resulting polymer and the antioxidant may be added to the polymerization system prior to, during or after the polymerization reaction.

The present invention will hereinafter be explained in more detail with reference to the following non-limitative working Examples and the effects practically achieved by the invention will also be discussed in detail in comparison with Comparative Examples.

The following Examples 1 to 7 relate to the first aspect of the present invention and Comparative Examples 1 to 3 are examples beyond the scope of the present invention.

EXAMPLE 1

To a 2000 l volume polymerizer of stainless steel, there were added 980 kg of deionized water, 382 g of partially saponified polyvinyl alcohol and 143 g of water-soluble methyl cellulose, the polymerizer was degassed and then 700 kg of vinyl chloride monomer was added. Thereafter, 280 g of di-2-ethylhexyl peroxydicarbonate as a polymerization initiator was pressed into the polymerizer under pressure with a high pressure pump while the contents of the polymerizer was stirred, simultaneously the temperature thereof was raised to initiate the polymerization and when the temperature of the contents of the polymerizer reached 58° C., the stirring of the contents was continued while maintaining them at that temperature When the rate of the polymerization reached 85%, a fluorine atom-containing nonionic surfactant was added in an amount of 0.05 part by weight per 100 parts by weight of the vinyl monomer mixture and the polymerization was further continued. As the fluorine atom-containing nonionic surfactant, Surflon S-382 available from Asahi Glass Co., Ltd. was used. The polymerization reaction was interrupted at the time when the pressure in the polymerizer reached 5.5 kg/cm$^2$, the unreacted monomers were recovered and the resulting polymer was dehydrated and dried to give powder of a vinyl chloride polymer.

EXAMPLE 2

The same procedures used in Example 1 were repeated except that Monflor 52 available from Kao Atlas Corporation was used as a fluorine atom-containing surfactant to give powder of a vinyl chloride polymer.

EXAMPLE 3

The same procedures used in Example 1 were repeated except that Fluorad FC-431 available from Sumitomo 3M Co., Ltd. was used as a fluorine atom-containing surfactant to give powder of a vinyl chloride polymer.

EXAMPLE 4

The same procedures used in Example 1 were repeated except that the fluorine atom-containing surfactant was used in an amount of 0.01 part by weight to give powder of a vinyl chloride polymer.

Comparative Example 1

The same procedures used in Example 1 were repeated except that any fluorine atom-containing surfactant was not used at all to give powder of a vinyl chloride polymer.

Comparative Example 2

The same procedures used in Example 1 were repeated except that 0.3 part by weight of an amine type cationic surfactant was substituted for the fluorine atom-containing surfactant used in Example 1 to give powder of a vinyl chloride polymer.

The powder of the vinyl chloride polymers prepared in Examples 1 to 4 and Comparative Examples 1 and 2 were tested for the following properties according to the methods detailed below.

Test of Polymer Powder for Flow Properties

The powder of each vinyl chloride polymer was allowed to stand for a whole day and night in an environment maintained at a temperature of 0° C. and a relative humidity (RH) of 40%, then 100 cc thereof was introduced into a funnel for bulk density measurement (JIS Standard K-6721) and the time required for the powder to completely fall down from the funnel was determined. In addition, to examine the effect of the electrification of the polymer powder on the flow properties, each polymer powder which had been allowed to stand in the environment defined above for a whole day and night was mixed in a Brabender's planetary mixer at 60 rpm for 5 minutes to electrify the polymer powder and then the time required for the powder to completely fall down from the funnel was determined in the same manner used above.

Test of Polymer Powder for Bulk Density

After the powder of each vinyl chloride polymer was allowed to stand for a whole day and night in an environment having a temperature of 0° C. and an RH of 40%, the bulk density thereof was determined according to JIS Standard K-6721. In addition, each polymer powder which had been allowed to stand in the environment defined above for a whole day and night was mixed in a Brabender's planetary mixer at 60 rpm for 5 minutes to electrify the polymer powder and then the bulk density of the powder was determined in the same manner used above.

Test of Polymer Powder for Thermal Stability

To 100 parts by weight of each vinyl chloride polymer, there were added the following compounds:

| | |
|---|---|
| zinc stearate | 2.5 parts by weight |
| barium stearate | 0.7 part by weight |
| tribasic lead sulfate | 0.5 part by weight |
| dioctyl phthalate | 30.0 parts by weight, | then the resulting mixture was kneaded by rolls maintained at 165° C. for 5 minutes and a sheet having a thickness of 1 mm was produced. The sheet was put in an oven maintained at a temperature of 195° C. and the time required for the sheet to cause blackening was determined to evaluate the thermal stability thereof. The results of these flow property test (F.P.T.), determination of bulk density (D.B.D.) and test of thermal stability (T.S.) are summarized in the following Table 1.

TABLE 1

| Ex. No. | Additive Kind | Amount[1] | Use of Mixer[2] | F.P.T. (sec) | D.B.D. (g/cm$^3$) | T.S. (min) |
|---|---|---|---|---|---|---|
| 1 | fluorine atom-containing nonionic surfactant | 0.05 0.05 | No Yes | 10.6 10.5 | 0.565 0.565 | 70 70 |
| 2 | fluorine atom-containing nonionic surfactant | 0.05 0.05 | No Yes | 10.8 10.6 | 0.564 0.563 | 70 70 |
| 3 | fluorine atom-containing nonionic surfactant | 0.05 0.05 | No Yes | 11.0 11.2 | 0.562 0.561 | 70 70 |
| 4 | fluorine atom-containing nonionic surfactant | 0.01 0.01 | No Yes | 11.0 11.3 | 0.563 0.560 | 70 70 |
| 1* | none | — — | No Yes | 12.5 do not fall down | 0.561 0.501 | 65 65 |
| 2* | amine type cationic surfactant | 0.3 0.3 | No Yes | 12.8 17.6 | 0.560 0.545 | 50 50 |

*: Comparative Example.
[1] part by weight.
[2] Planetary mixer.

To examine the effect of the time of addition of the fluorine atom-containing on the quality of the resulting polymer powder, the following Examples were carried out.

Examples 5 to 7 and Comparative Example 3

In the same manner used in Example 1, powder of polymers were prepared except that the time of addition of the fluorine atom-containing nonionic surfactant was altered as listed in the following Table 2. The condition of the scale adhered to the inner wall of the polymerizer was examined and the flow properties and bulk density of the resulting powder of polymers were likewise determined in the same manner used in Example 1. The results thus obtained are listed in Table 2.

TABLE 2

| Ex. No. | Time of addition (Rate of Polymerization) | Condition of Scale Adhered to Wall | Use of Mixer[1) ] | F.P.T. (sec) | D.B.D. (g/cm$^3$) |
|---|---|---|---|---|---|
| 5 | 85% | almost no scale adhesion to wall | No | 10.6 | 0.565 |
|   | 85% | almost no scale adhesion to wall | Yes | 10.5 | 0.565 |
| 6 | 70% | almost no scale adhesion to wall | No | 10.7 | 0.564 |
|   | 70% | almost no scale adhesion to wall | Yes | 11.0 | 0.563 |
| 7 | added to the slurry obtained after recovery of the unreacted monomer | almost no scale adhesion to wall | No | 10.5 | 0.565 |
|   |   | almost no scale adhesion to wall | Yes | 10.7 | 0.567 |
| 3* | 60% | adhered to the entire surface of the wall | No | 11.2 | 0.564 |
|   | 60% |   | Yes | 11.5 | 0.560 |

*: Comparative Example.
[1)]Planetary Mixer.

The following Examples 8 to 16 relate to the method of the second aspect of the present invention while Comparative Examples 4 to 7 are examples beyond the scope of the present invention.

The following examples (Examples 8 to 13) are carried out to examine the effect of the kinds and average particle sizes of fine powder of inorganic substances used on the properties of the resulting polymer powder.

EXAMPLE 8

In this Example, polymerization was performed in the same manner used in Example 1 except that fine powder of graphite having an average particle size of 1 μm was used in an amount of 0.1 part by weight per 100 parts by weight of the vinyl monomer mixture. The polymerization reaction was interrupted at the time when the pressure in the polymerizer reached 5.5 kg/cm$^2$, the unreacted monomers were recovered, then the polymer slurry was dehydrated and the resulting polymer cake was dried to give powder of a vinyl chloride polymer.

EXAMPLE 9

The same procedures used in Example 8 were repeated except that fine silica powder having an average particle size of 0.1 μm was used as the inorganic fine powder component to give powder of a vinyl chloride polymer.

EXAMPLE 10

The same procedures used in Example 8 were repeated except that fine silica powder having an average particle size of 10 μm was used as the inorganic fine powder component to give powder of a vinyl chloride polymer.

EXAMPLE 11

The same procedures used in Example 8 were repeated except that fine powder of calcium hydroxide having an average particle size of 5 μm was used as the inorganic fine powder component to give powder of a vinyl chloride polymer.

EXAMPLE 12

The same procedures used in Example 8 were repeated except that fine powder of aluminum oxide having an average particle size of 10 μm was used as the inorganic fine powder component to give powder of a vinyl chloride polymer.

EXAMPLE 13

The same procedures used in Example 8 were repeated except that fine powder of barium sulfate having an average particle size of 20 μm was used as the inorganic fine powder component to give powder of a vinyl chloride polymer.

The following Comparative Examples 4 to 6 each relates to an example in which any inorganic fine powder was not used at all, the inorganic fine powder having different average particle size was used or the inorganic fine powder component was used in a different amount.

Comparative Example 4

The same procedures used in Example 8 were repeated except that any inorganic fine powder component was not used to give powder of a vinyl chloride polymer.

Comparative Example 5

The same procedures used in Example 9 were repeated except that fine powder of silica having an average particle size of 100 μm was used as the inorganic fine powder component to give powder of a vinyl chloride polymer.

Comparative Example 6

The same procedures used in Example 9 were repeated except that fine powder of silica as the inorganic fine powder component was used in an amount of 0.0005 part by weight to give powder of a vinyl chloride polymer.

The flow properties and the bulk density of the powder of the vinyl chloride polymers obtained in the foregoing Examples 8 to 13 and Comparative Examples 4 to 6 were determined according to the following methods:

Test of Polymer Powder for Flow Properties

After allowing the powder of each vinyl chloride polymer to stand in an environment maintained at a temperature of 0° C. and an RH of 40% or that maintained at a temperature of 27° C. and an RH of 35% for a whole day and night, the time required for the powder to completely fall down from a funnel was determined in the same manner used in Example 1.

Test of Polymer Powder for Bulk Density

After allowing the powder of each vinyl chloride polymer to stand in an environment maintained at a temperature of 0° C. and an RH of 40% or that maintained at a temperature of 27° C. and an RH of 35% for a whole day and night, the bulk density of the powder was determined in the same manner used in Example 1.

The results thus obtained are summarized in Table 3.

TABLE 3

| Ex. No. | Fine Powder Kind (Amount[1]) | $d_{av}$ μm | Use[2] of Mixer | Flow Properties (sec) 27° C., 35% | Flow Properties (sec) 0° C., 40% | Bulk Density (g/cm²) 27° C., 35% | Bulk Density (g/cm²) 0° C., 40% |
|---|---|---|---|---|---|---|---|
| 8 | graphite (0.1) | 1 | No | 10.6 | 10.9 | 0.569 | 0.569 |
|   | graphite (0.1) | 1 | Yes | 10.7 | 11.0 | 0.569 | 0.568 |
| 9 | silica (0.1) | 0.1 | No | 10.5 | 10.6 | 0.567 | 0.566 |
|   | silica (0.1) | 0.1 | Yes | 10.7 | 10.9 | 0.567 | 0.567 |
| 10 | silica (0.1) | 10 | No | 10.8 | 10.9 | 0.567 | 0.566 |
|   | silica (0.1) | 10 | Yes | 10.8 | 10.9 | 0.565 | 0.565 |
| 11 | Ca(OH)₂ (0.1) | 5 | No | 11.0 | 11.1 | 0.566 | 0.565 |
|   | Ca(OH)₂ (0.1) | 5 | Yes | 11.1 | 11.2 | 0.565 | 0.565 |
| 12 | Al₂O₃ (0.1) | 10 | No | 10.6 | 10.8 | 0.565 | 0.565 |
|   | Al₂O₃ (0.1) | 10 | Yes | 10.8 | 11.0 | 0.564 | 0.565 |
| 13 | BaSO₄ (0.1) | 20 | No | 11.0 | 11.2 | 0.564 | 0.563 |
|   | BaSO₄ (0.1) | 20 | Yes | 11.1 | 11.1 | 0.563 | 0.563 |
| 4* | none (—) | — | No | 11.5 | 13.5 | 0.560 | 0.561 |
|   | none (—) | — | Yes | do not fall down | do not fall down | 0.518 | 0.501 |
| 5* | silica (0.1) | 100 | No | 12.0 | 12.1 | 0.562 | 0.563 |
|   | silica (0.1) | 100 | Yes | 16.8 | 17.5 | 0.522 | 0.519 |
| 6* | silica (0.0005) | 0.1 | No | 12.1 | 12.2 | 0.560 | 0.559 |
|   | silica (0.0005) | 0.1 | Yes | 17.8 | 17.6 | 0.517 | 0.510 |

*: Comparative Example.
[1] part by weight.
[2] Planetary Mixer.

The following Examples were performed while the inorganic fine powder was added to the polymerization system at different stages (at various rates of polymerization).

Examples 14 to 16 and Comparative Example 7

The same procedures used in Example 8 were repeated except that graphite as the inorganic fine powder component was added to the polymerization system at different stages as detailed in the following Table 4 to give powder of a vinyl chloride polymer.

After completion of the polymerization, the condition of the scale adhered to the inner wall of the polymerizer was examined. In addition, after allowing each powder to stand at 0° C. and an RH 40%, the flow properties and bulk density of the resulting powder of polymers were likewise determined in the same manner used in Example 5. The results thus obtained are listed in Table 4.

TABLE 4

| Ex. No. | Time of Addition (Rate of Polymerization) | Condition of Scale Adhered | Use of Mixer[1] | F.P.T. (sec) | D.B.D. (g/cm³) |
|---|---|---|---|---|---|
| 14 | *2 | almost no scale adhesion | No | 10.8 | 0.568 |
|   | *2 | almost no scale adhesion | Yes | 10.9 | 0.568 |
| 15 | *3 | almost no scale adhesion | No | 10.7 | 0.568 |
|   | *3 | almost no scale adhesion | Yes | 10.8 | 0.566 |
| 16 | 70% | almost no scale adhesion | No | 11.1 | 0.567 |
|   | 70% | almost no scale adhesion | Yes | 11.0 | 0.565 |
| 7* | 60% | adhered to the entire surface of the wall | No | 12.8 | 0.552 |
|   | 60% | adhered to the entire surface | Yes | 13.8 | 0.541 |

TABLE 4-continued

| Ex. No. | Time of Addition (Rate of Polymerization) | Condition of Scale Adhered | Use of Mixer[1] | F.P.T. (sec) | D.B.D. (g/cm³) |
|---|---|---|---|---|---|
| | | of the wall | | | |

*: Comparative Example.
[1] Planetary Mixer.
*2: The inorganic fine powder was added to the polymer slurry obtained after the unreacted monomers were recovered.
*3: The inorganic fine powder was added to the polymer cake obtained after the unreacted monomers were recovered.

These test results clearly indicate that the powder of the vinyl chloride polymers obtained according to the method of the present invention did not show any lowering of the flow properties due to the electrification of the powder and hence maintained sufficient flow properties. Moreover, the powder of the present invention had stable and constant bulk density irrespective of the changes in the environmental conditions. The powder obtained by the method of this invention satisfied the basic quality requirements for vinyl chloride polymer such as thermal stability. Furthermore, the method of the present invention further achieved the effect of inhibiting the adhesion of scale onto the inner wall of the polymerizer.

What is claimed is:

1. A method for preparing powder of a vinyl chloride polymer comprising the steps of polymerizing vinyl chloride monomer or a vinyl monomer mixture mainly comprising vinyl chloride monomer in an aqueous medium and adding, to the polymerization system, a fluorine atom-containing nonionic surfactant in an amount ranging from 0.0001 to 0.5 part by weight per 100 parts by weight of the vinyl chloride monomer or the vinyl monomer mixture mainly comprising vinyl chloride monomer after the rate of polymerization reaches at least 70%.

2. The method of claim 1 wherein the aqueous medium comprises at least one dispersing agent selected from the group consisting of methyl cellulose, ethyl cellulose, hydroxyethyl cellulose, hydroxypropyl cellulose, hydroxy-propylmethyl cellulose, water-soluble or oil-soluble partially saponified polyvinyl alcohols, polymers of acrylic acid, gelatin, sorbitan monolaurate, sorbitan trioleate, sorbitan monostearate, glycerin tristerate, ethylene oxide-propylene oxide block copolymers, polyoxyethylene sorbitan monolaurate, polyoxyethylene glycerin oleate, sodium laurate, calcium carbonate, calcium phosphate and sodium dodecylbenzenesulfonate.

3. The method of claim 1 wherein the aqueous medium comprises at least one polymerization initiator selected from the group consisting of diisopropyl peroxydicarbonate, di-2-ethylhexyl peroxydicarbonate, diethoxyethyl peroxydicarbonate, t-butyl peroxy pivalate, t-hexyl peroxy pivalate, α-cumyl peroxy neodecanate, 2,4,4-trimethylpentyl-2-peroxy-2-neodecanate, acetylcyclohexylsulfonyl peroxide, 2,4,4-trimethylpentyl-2-peroxyphenoxy acetate, 3,5,5-trimethylhexanoyl peroxide, lauroyl peroxide, azobis-2,4-dimethylvaleronitrile, azobis(4-methoxy-2,4-dimethyl-valeronitrile), potassium persulfate, ammonium persulfate, hydrogen peroxide and cumene hydroperoxide.

4. The method of claim 1 wherein the starting vinyl chloride monomer comprises vinyl chloride alone or a mixture of not less than 50% by weight of vinyl chloride monomer and at least one other vinyl monomer copolymerizable with vinyl chloride monomer.

5. The method of claim 4 wherein the vinyl monomer copolymerizable with vinyl chloride monomer is at least one member selected from the group consisting of vinyl acetate, vinyl propionate, methyl acrylate, ethyl acrylate, methyl methacrylate, ethyl methacrylate, ethylene, propylene, lauryl vinyl ether, isobutyl vinyl ether, maleic anhydride, acrylonitrile, styrene and vinylidene chloride.

* * * * *